US012759732B2

(12) United States Patent
Hickenbottom et al.

(10) Patent No.: US 12,759,732 B2
(45) Date of Patent: Oct. 13, 2026

(54) SYSTEMS, APPARATUSES, METHODS, AND COMPUTER PROGRAM PRODUCTS FOR EARLY DETECTION OF ANTI-ICE VALVE FAILURES

(71) Applicant: Honeywell International Inc., Charlotte, NC (US)

(72) Inventors: Christopher Dean Hickenbottom, Glendale, AZ (US); Zdenek Hrncir, Brno (CZ); Mark MacRae West, Mesa, AZ (US)

(73) Assignee: Honeywell International Inc., Charlotte, NC (US)

( * ) Notice: Subject to any disclaimer, the term of this patent is extended or adjusted under 35 U.S.C. 154(b) by 161 days.

(21) Appl. No.: 18/755,190

(22) Filed: Jun. 26, 2024

(65) Prior Publication Data

US 2026/0001661 A1 Jan. 1, 2026

(51) Int. Cl.
*B64F 5/60* (2017.01)

(52) U.S. Cl.
CPC .................................... *B64F 5/60* (2017.01)

(58) Field of Classification Search
CPC ....... B64F 5/60; G07C 5/0808; G07C 5/0816; B64D 15/04
See application file for complete search history.

(56) References Cited

U.S. PATENT DOCUMENTS 8,843,253 B1 * 9/2014 Chapman ............... B64D 15/22 701/14
9,971,969 B2 * 5/2018 Horabin ................... G06N 5/04
10,589,866 B2 * 3/2020 Morishita ................ B64C 3/00
11,674,438 B1 * 6/2023 Rambo ................... F02C 7/047 60/785
11,780,591 B2 * 10/2023 Kim ....................... B64D 13/06 62/172
2006/0260323 A1 * 11/2006 Moulebhar ........... F01D 21/003 60/793
2010/0155634 A1 * 6/2010 do Amaral ......... G05B 23/0237 73/1.72
2013/0037234 A1 * 2/2013 Mackin .................. B64D 13/08 165/41
2014/0163812 A1 * 6/2014 Randerath ............ G05B 23/024 701/32.9
2014/0191083 A1 * 7/2014 Carpino, II ............ B64D 15/22 244/134 D (Continued)

*Primary Examiner* — Mussa A Shaawat
(74) *Attorney, Agent, or Firm* — Alston & Bird LLP

(57) ABSTRACT

Embodiments of the present disclosure provide early anti-ice valve fault detection. Engine data associated with a flight operation of an aircraft may be received, the engine data may comprise timeseries data for one or more monitored engine parameters and the aircraft may be associated with an anti-ice system comprising a thermal anti-ice valve and a pressure sensor. One or more feature datasets may be extracted from the engine data and using one or more feature extraction models. Each feature dataset may represent a data slice from the engine data that satisfies thermal anti-ice valve feature extraction criteria. An anti-ice valve fault prediction may be generated by applying the feature dataset to one or more fault prediction models. The performance of one or more prediction-based actions may be initiated based on the anti-ice valve fault prediction.

20 Claims, 9 Drawing Sheets

(56) References Cited

U.S. PATENT DOCUMENTS

| | | | | |
|---|---|---|---|---|
| 2017/0061295 | A1* | 3/2017 | Horabin | G06N 5/04 |
| 2018/0065752 | A1* | 3/2018 | Franco | B64D 13/06 |
| 2019/0057560 | A1* | 2/2019 | Chopra | G05B 23/0237 |
| 2019/0093557 | A1* | 3/2019 | Thomas | B64D 15/08 |
| 2020/0009412 | A1* | 1/2020 | Rheaume | A62C 99/0018 |
| 2020/0320803 | A1* | 10/2020 | Shao | B64D 45/00 |
| 2020/0378856 | A1* | 12/2020 | Warlick | G01L 27/007 |
| 2022/0258850 | A1* | 8/2022 | Bogucki | B64D 29/08 |
| 2023/0264820 | A1* | 8/2023 | Santini | B64C 9/26<br>244/134 B |
| 2025/0131836 | A1* | 4/2025 | Gu | G08G 5/51 |

* cited by examiner

SYSTEMS, APPARATUSES, METHODS, AND COMPUTER PROGRAM PRODUCTS FOR EARLY DETECTION OF ANTI-ICE VALVE FAILURES

TECHNICAL FIELD

The present disclosure relates, generally, to aircraft ice protection, and more particularly to systems, apparatuses, methods, and computer program products for early detection of anti-ice valve failures.

BACKGROUND

When an aircraft is flown during certain atmospheric conditions, ice can form and potentially accumulate on one or more of its exterior surfaces. Such ice formation and accumulation can result from, for example, impingement of atmospheric water droplets. The formation and accumulation of ice can have certain adverse and/or deleterious effects on aircraft performance. An anti-ice protection system may be configured to prevent ice formation on aircraft surfaces by moving hot air from the engine to the front of the engine. Many of these anti-ice protections systems include a thermal anti-ice valve (referred to herein, interchangeably as anti-ice valve) that is moveable between a closed position and an open position to facilitate control of the flow of hot air to the front of the engine. Applicant has observed that these anti-ice valves may fail in an open stuck position causing maintenance codes to be triggered from the engine control unit (ECU), which in turn drives unscheduled maintenance and potential aircraft on ground (AOG).

Applicant has discovered problems with anti-ice protection system, and in particular problems with existing solutions for anti-ice valve failure detection. Through applied effort, ingenuity, and innovation, Applicant has solved many of these identified problems by developing solutions embodied in the present disclosure, which are described in detail below.

BRIEF SUMMARY

In accordance with one aspect of the present disclosure, a computer-implemented method for early anti-ice valve fault is provided. The computer-implemented method is executable using any of a myriad of computing device(s) and/or combinations of hardware, software, and/or firmware. In some example embodiments, an example computer-implemented method includes receiving, by one or more processors, engine data associated with a flight operation of an aircraft, wherein the engine data comprises timeseries data for one or more monitored engine parameters, and wherein the aircraft is associated with an anti-ice system comprising a thermal anti-ice valve and a pressure sensor; extracting, by the one or more processors, from the engine data and using one or more feature extraction models, one or more feature datasets, wherein each feature dataset represents a data slice from the engine data that satisfies thermal anti-ice valve feature extraction criteria; generating, by the one or more processors, an anti-ice valve fault prediction by applying the feature dataset to one or more fault prediction models; and initiating, by the one or more processors, the performance of one or more prediction-based actions based on the anti-ice valve fault prediction.

In some embodiments, the anti-ice valve fault prediction indicates a stuck-open thermal anti-ice valve condition associated with the thermal anti-ice valve.

In some embodiments, the one or more feature extraction models comprise a machine learning model.

In some embodiments, each feature dataset comprises an anti-ice command data and anti-ice pressure data associated with the corresponding data slice, wherein the anti-ice command data is configured to facilitate selective supply of hot engine bleed air flow to one or more components of the anti-ice system and the anti-ice pressure data indicates the occurrence of the hot engine bleed air flow.

In some embodiments, generating the thermal anti-ice fault prediction comprises for each feature dataset: comparing the anti-ice command data to the anti-ice pressure data; determining whether the anti-ice command data and the anti-ice pressure data match; and in response to determining that the anti-ice command data and the anti-ice pressure data do not match, increasing an abnormal anti-ice valve condition count for the flight operation.

In some embodiments, generating the thermal anti-ice fault prediction further comprises determining whether the abnormal anti-ice valve condition count satisfies a fault prediction threshold; and in response to determining that the abnormal anti-ice valve condition count satisfies the fault prediction threshold, generating a positive anti-ice valve fault prediction indicative of a stuck-open thermal anti-ice valve.

In some embodiments, the one or more prediction-based actions comprise generating one or more recommendations in response to a positive anti-ice valve fault prediction; and causing rendering of a user interface comprising the one or more recommendations on a user device.

In accordance with another aspect of the present disclosure, an apparatus for asset performance predictions is provided. The apparatus in some embodiments includes at least one processor and at least one non-transitory memory, the at least one non-transitory memory having computer-coded instructions stored thereon. The computer-coded instructions in execution with the at least one processor causes the apparatus to perform any of the example computer-implemented methods described herein. In some other embodiments, the apparatus includes means for performing each step of any of the computer-implemented methods described herein.

In accordance with another aspect of the present disclosure, a computer program product for asset performance predictions is provided. The computer program product in some embodiments includes at least one non-transitory computer-readable storage medium having computer program code stored thereon. The computer program code in execution with at least one processor is configured for performing any one or the example computer-implemented methods described herein.

BRIEF DESCRIPTION OF THE SEVERAL VIEWS OF THE DRAWINGS

Figure 1A:
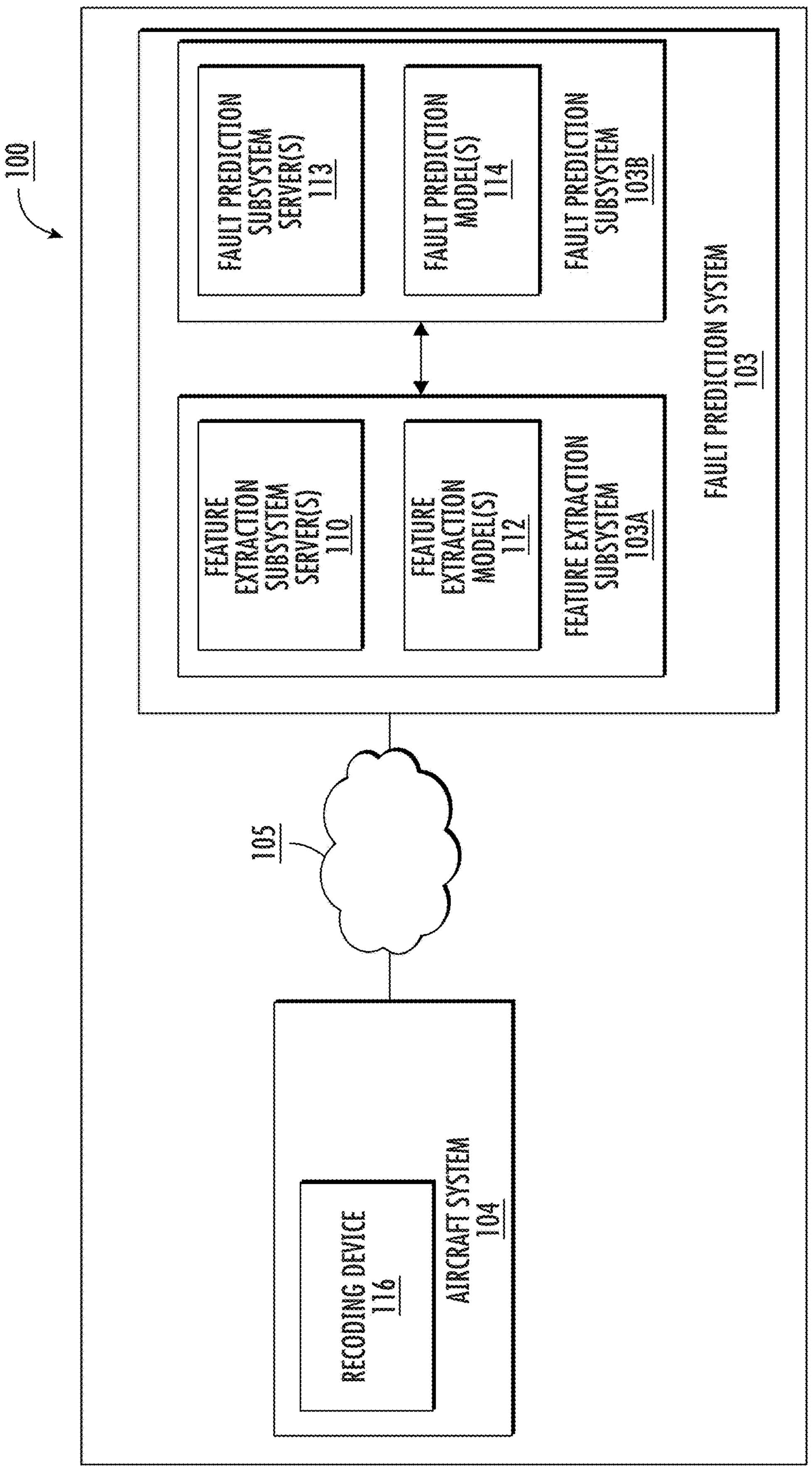

Having thus described the embodiments of the disclosure in general terms, reference now will be made to the accompanying drawings, which are not necessarily drawn to scale, and wherein:

FIG. 1A illustrates a block diagram of an example system architecture in which embodiments of the present disclosure may operate.

Figure 1B:
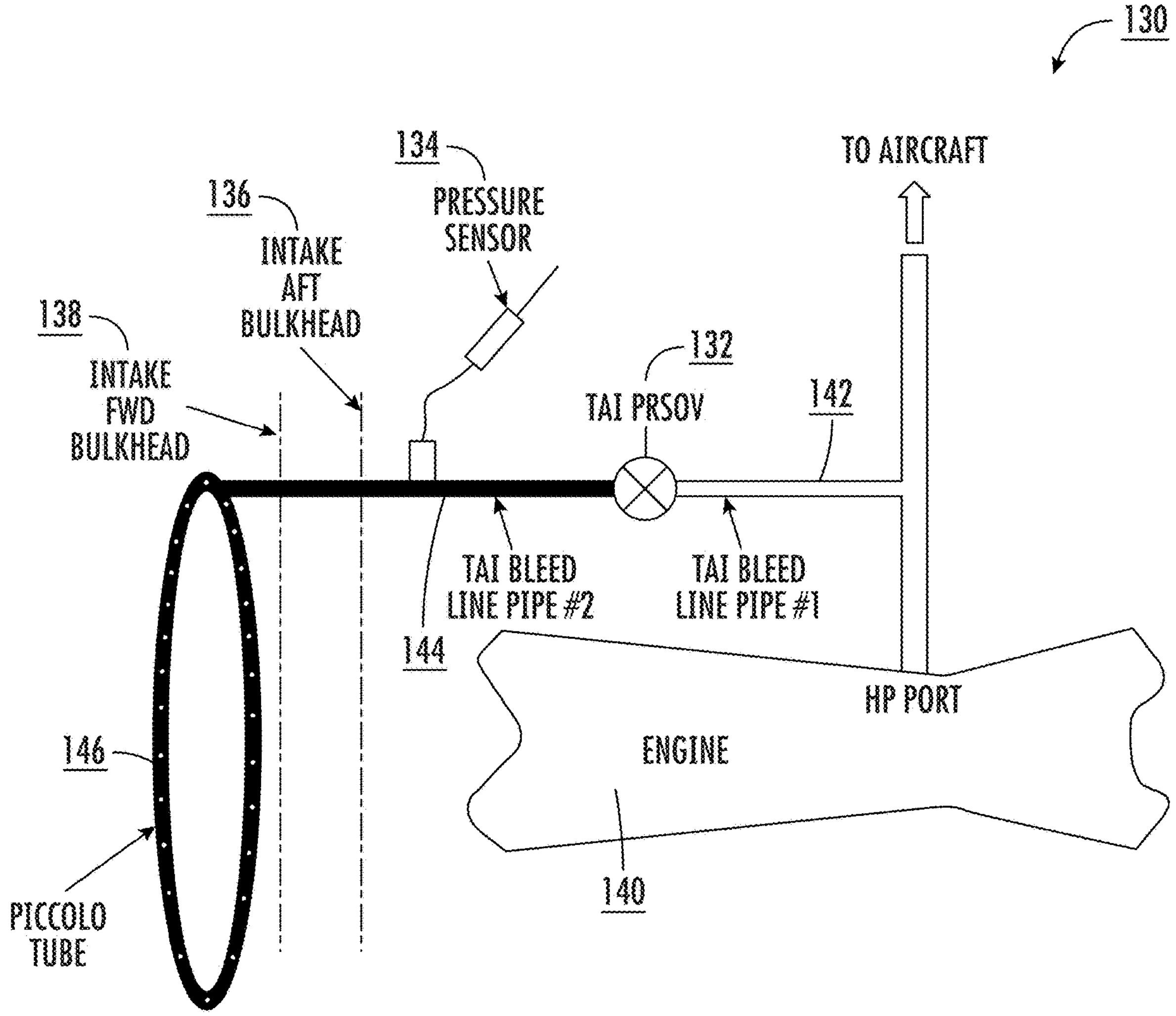

FIG. 1B illustrates an example anti-ice system in accordance with at least one example embodiment of the present disclosure.

Figure 1C:
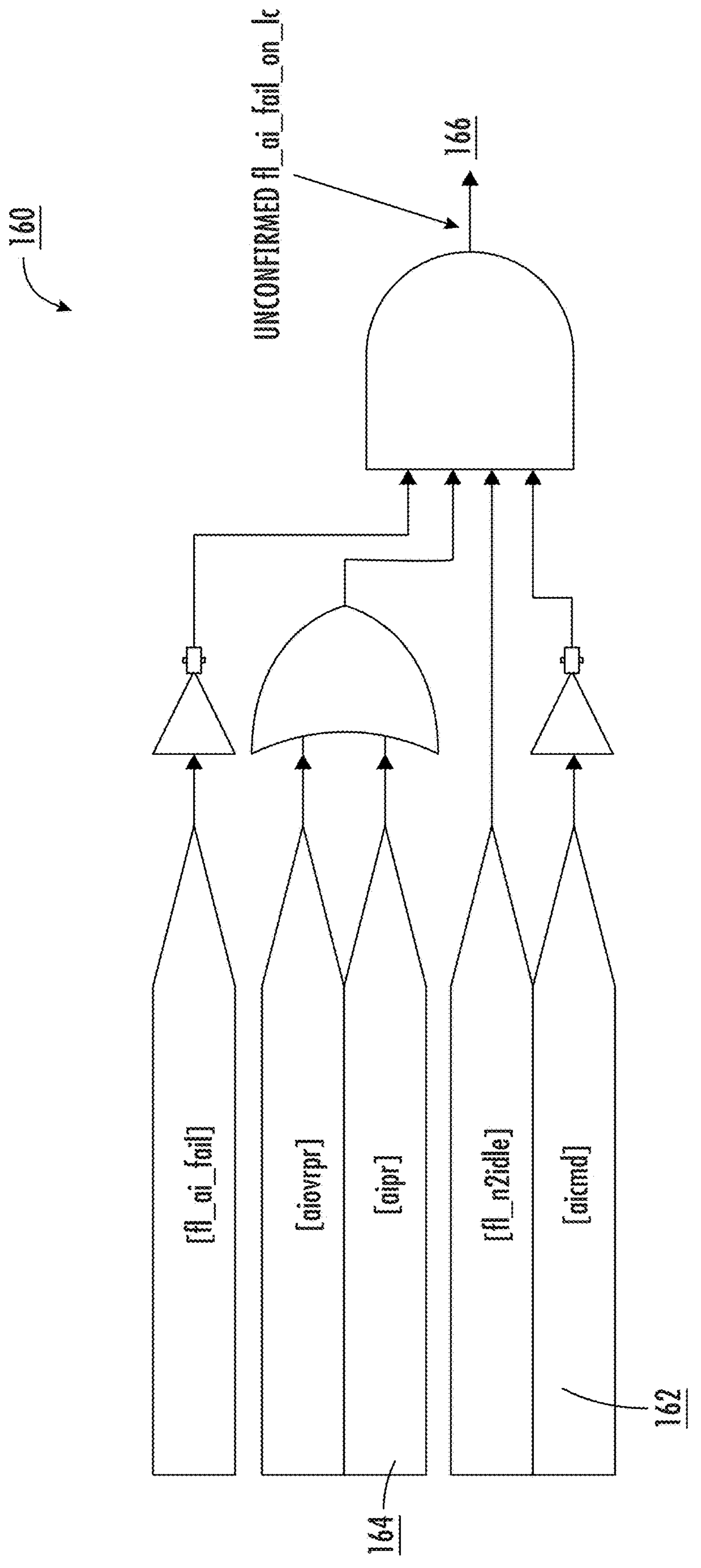

FIG. 1C illustrates a block diagram of an example logic in accordance with at least one example embodiment of the present disclosure.

Figure 2:
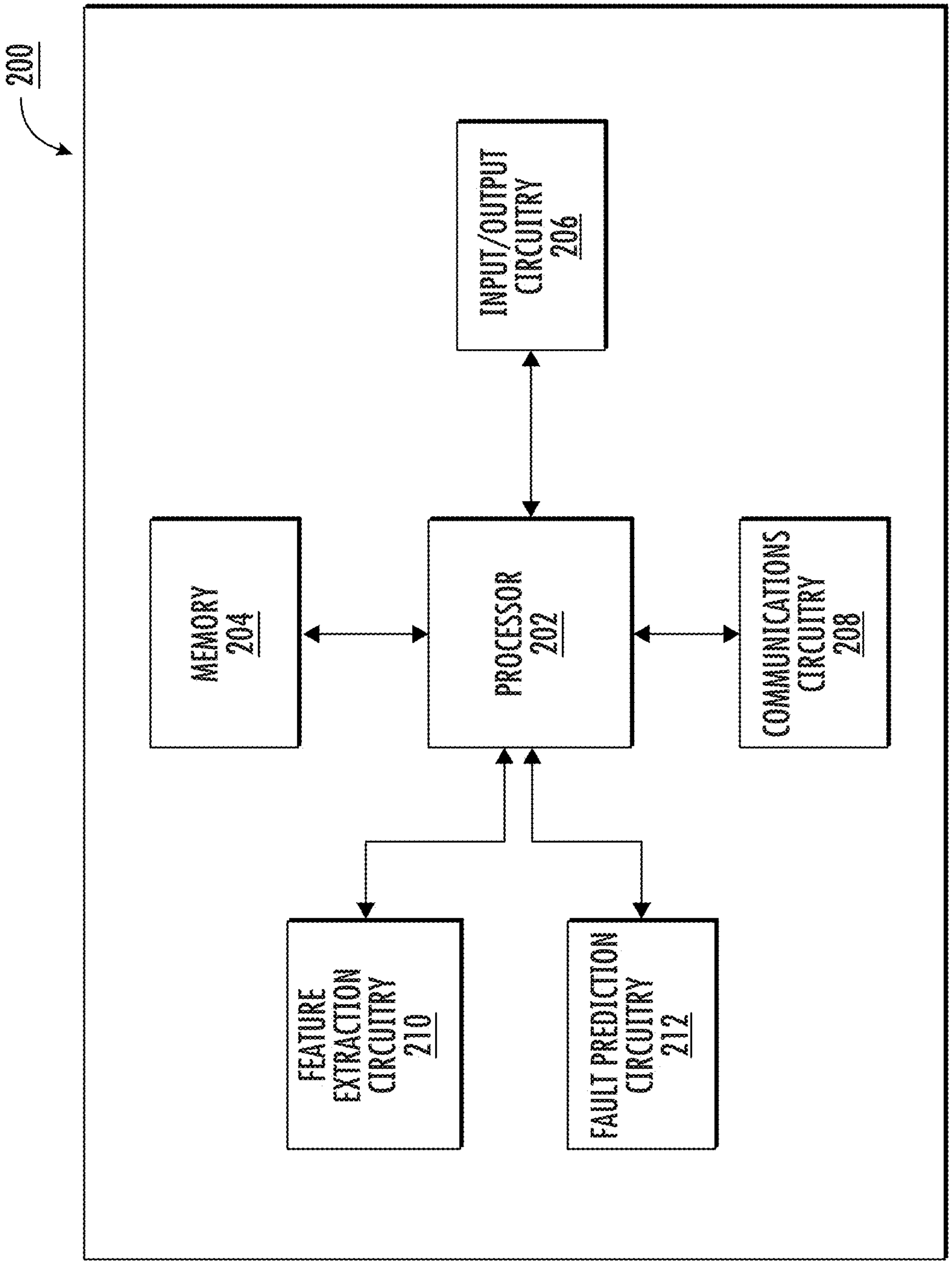

FIG. 2 illustrates a block diagram of an example apparatus in accordance with at least one example embodiment of the present disclosure.

Figure 3:
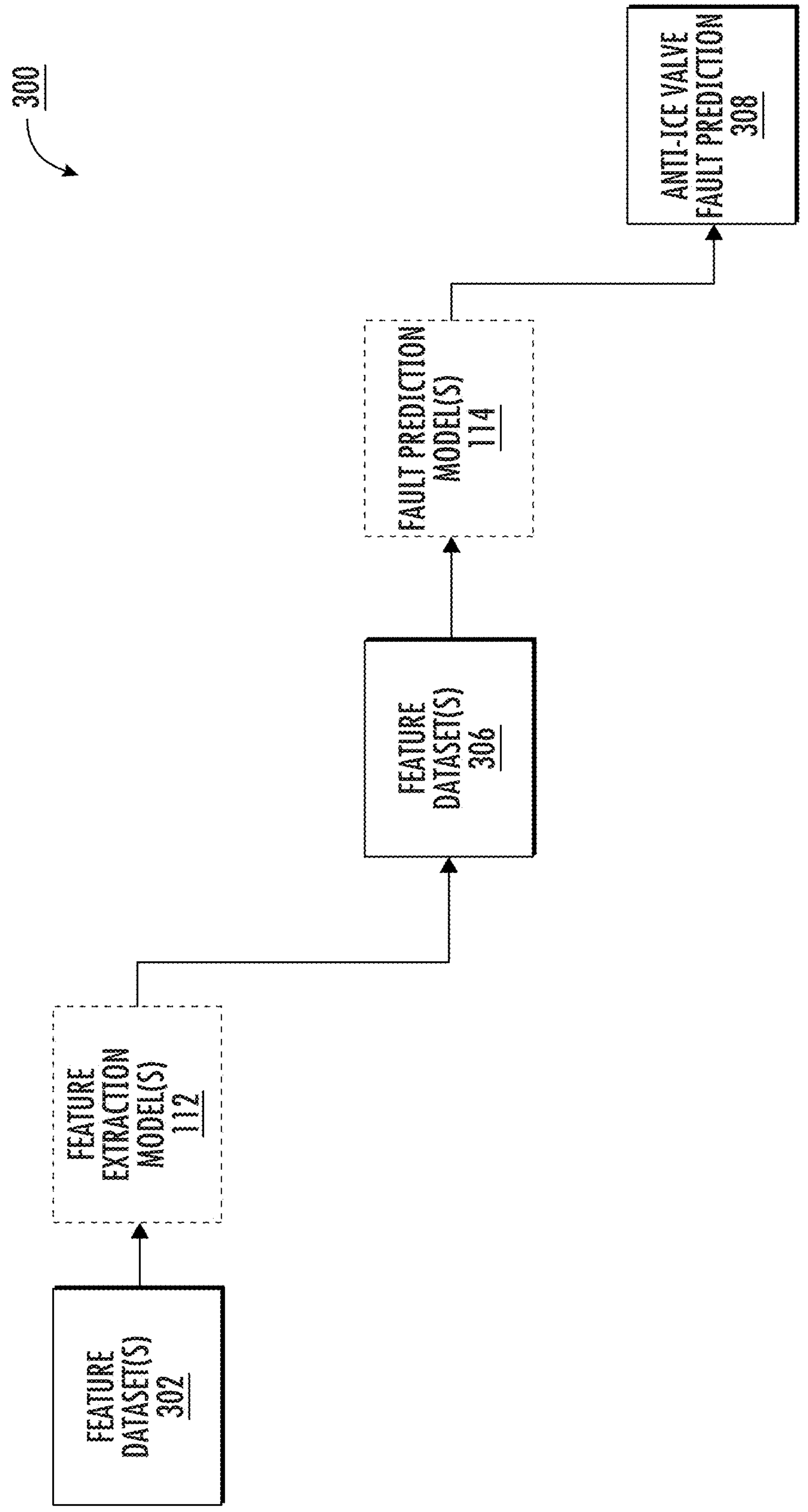

FIG. 3 illustrates a data flow diagram showing example data structures for early anti-ice valve fault detection in accordance with at least one example embodiment of the present disclosure.

Figure 4:
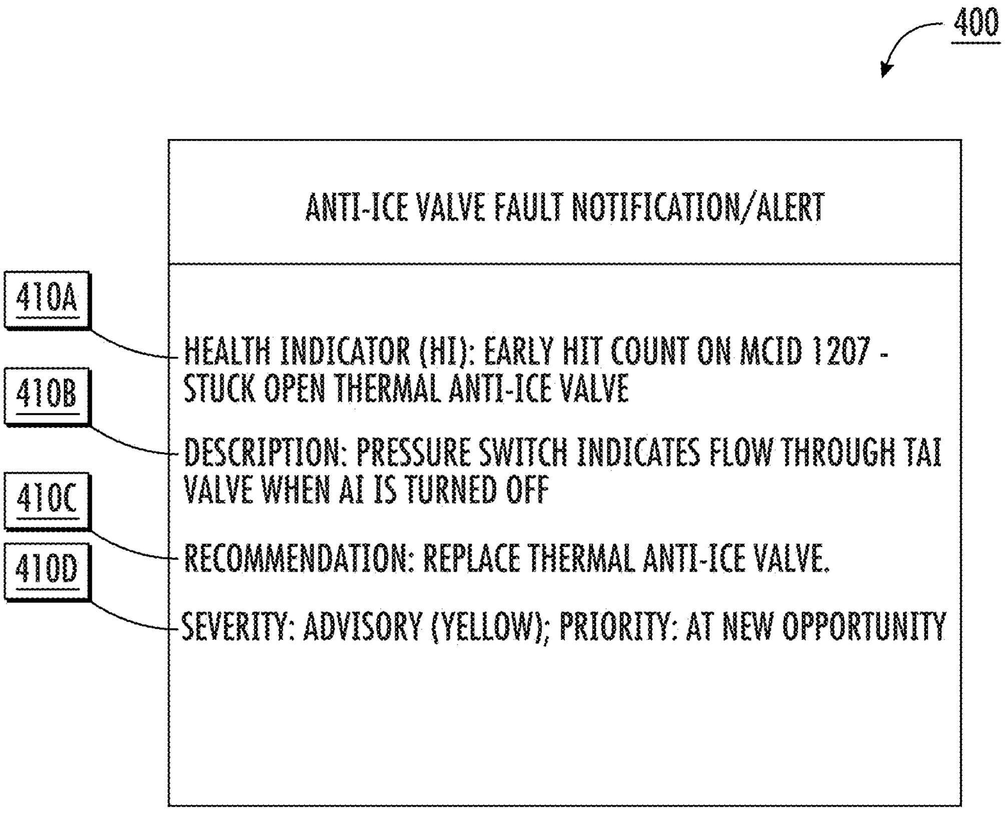

FIG. 4 illustrates an example user interface in accordance with at least one example embodiment of the present disclosure.

Figure 5:
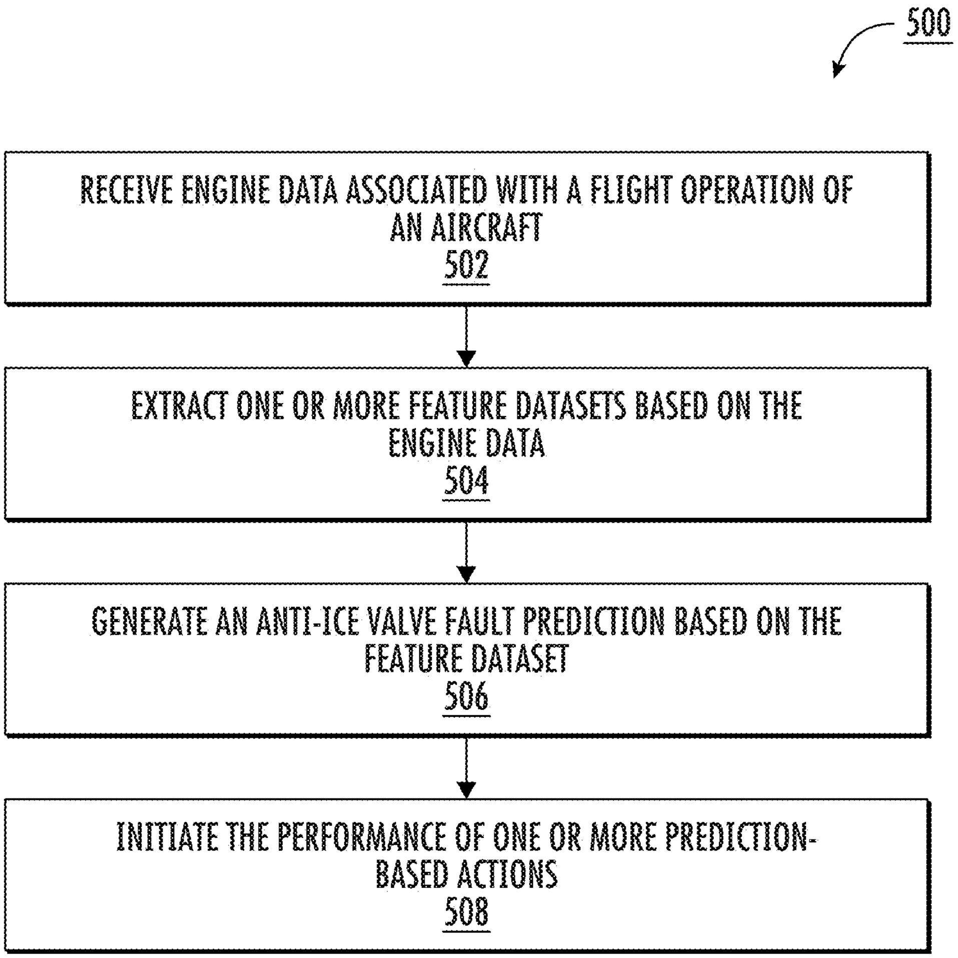

FIG. 5 illustrates flowchart including operations of an example process for early anti-ice valve fault detection in accordance with at least one example embodiment of the present disclosure.

Figure 6A:
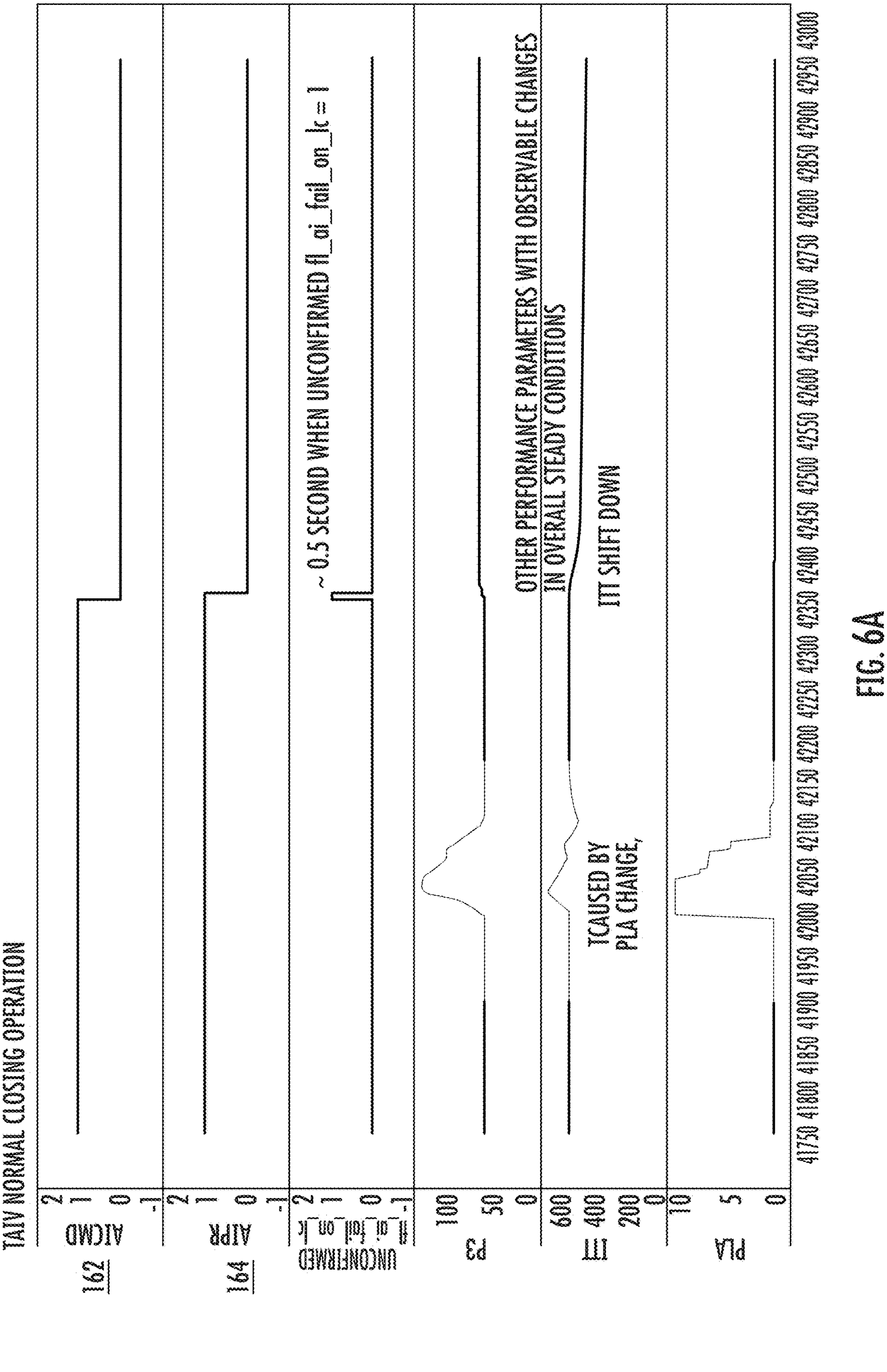

FIG. 6A illustrates an example validation test result in accordance with at least some example embodiments of the present disclosure.

Figure 6B:
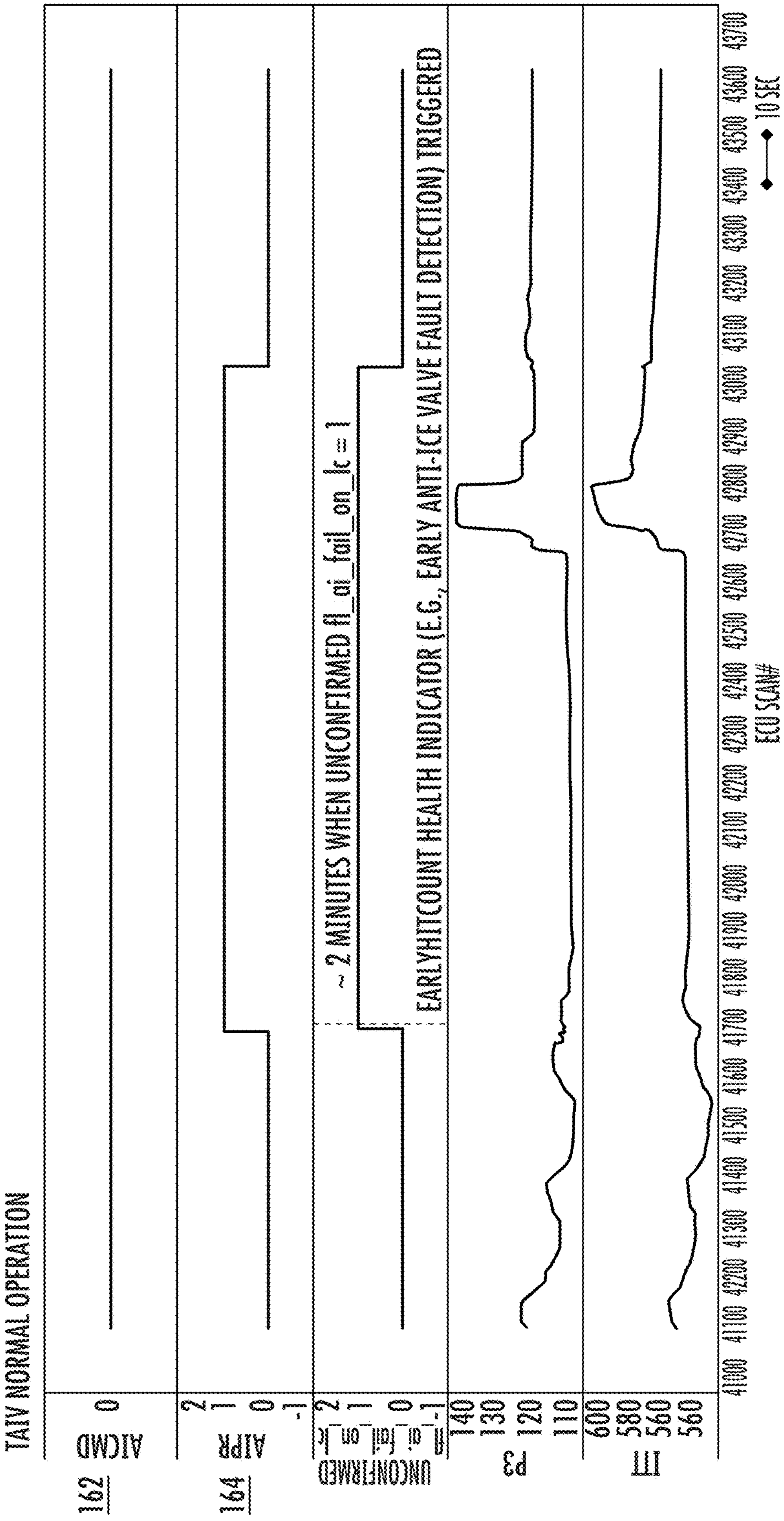

FIG. 6B illustrates an example validation test result in accordance with at least some example embodiments of the present disclosure.

DETAILED DESCRIPTION

Various embodiments of the present disclosure now will be described more fully hereinafter with reference to the accompanying drawings, in which some, but not all, embodiments of the present disclosure are shown. Indeed, the present disclosure may be embodied in many different forms and should not be construed as limited to the embodiments set forth herein, rather, these embodiments are provided so that this disclosure will satisfy applicable legal requirements.

The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Various embodiments of the present disclosure are generally directed to systems, apparatuses, methods, and computer program products for early anti-ice valve fault detection.

When an aircraft is flown during certain atmospheric conditions, ice can form and potentially accumulate on one or more of its exterior surfaces. Such ice formation and accumulation can result from, for example, impingement of atmospheric water droplets. The formation and accumulation of ice can have certain adverse and/or deleterious effects on aircraft performance. An anti-ice protection system may be configured to prevent ice formation on aircraft surfaces by moving hot air from the engine to the front of the engine. Many of these anti-ice protections systems include an anti-ice valve that is moveable between a closed position and an open position to facilitate control of the flow of hot air to the front of the engine. Applicant has observed that these anti-ice valves may fail in an open stuck position causing maintenance codes to be triggered from the engine control unit (ECU), which in turn drives unscheduled maintenance and potential aircraft on ground (AOG).

An ECU associated with an aircraft may include an anti-ice valve fault detection logic. This anti-ice valve fault detection logic is generally configured to detect when an anti-ice valve fault has occurred, which often results in aircraft on ground and/or flight deck effect. Example embodiments of the present disclosure provide for early detection of anti-ice valve faults prior to flight deck effect. An example embodiment may replicate a particular portion of the ECU fault detection logic but associated with lower threshold s for triggering an anti-ice valve fault indicator (e.g., a health indicator) when an abnormal condition of the anti-ice valve is detected. Accordingly, example embodiments reduce unscheduled maintenance, reduce costs associated with unscheduled maintenance, and improve flight operation safety.

Definitions

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might"

(or other such language) be included or have a characteristic, that a specific component or feature is not required to be included or to have the characteristic. Such a component or feature may be optionally included in some embodiments, or it may be excluded.

As used herein, the terms "data," "content," "digital content," "information," and similar terms may be used interchangeably to refer to data capable of being transmitted, received, and/or stored in accordance with embodiments of the present disclosure. Further, where a computing entity is described herein to receive data from another computing entity, it will be appreciated that the data may be received directly from another computing entity or may be received indirectly via one or more intermediary computing entities, such as, for example, one or more servers, relays, routers, network access points, base stations, hosts, and/or the like, sometimes referred to herein as a "network." Similarly, where a computing entity is described herein to send data to another computing device, it will be appreciated that the data may be sent directly to another computing entity or may be sent indirectly via one or more intermediary computing devices, such as, for example, one or more servers, relays, routers, network access points, base stations, hosts, and/or the like.

Example Systems and Apparatuses of the Disclosure

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

In this regard, FIG. 1A provides an example overview of a system architecture 100 in accordance with at least some example embodiments of the present disclosure. The depiction of the example architecture 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1A and the architecture 100 disclosed therein is merely presented to provide an example basis and context for the facilitation of some of the features, aspects, and uses of the methods, apparatuses, computer readable media, and computer program products disclosed and contemplated herein. It will be understood that while many of the aspects and components presented in FIG. 1 are shown as discrete, separate elements, other configurations may be used in connection with the methods, apparatuses, computer readable media, and computer programs described herein, including configurations that combine, omit, separate, and/or add aspects and/or components. The example system architecture 100 may be used in a plurality of domains and not limited to any specific application as disclosed herewith. In particular, while some example embodiments are described herein with reference to aircraft domain, the example system architecture 100 may be used in a plurality of domains and limited to any specific application as disclosed herein. The plurality of domains may include aviation, healthcare, industrial, manufacturing, education, retail, to name a few.

As illustrated, the system architecture 100 includes an aircraft system 104 in communication with a fault prediction system 103. In some embodiments, the aircraft system 104 communicates with the fault prediction system 103 over one or more communications network(s), for example a communications network 105. It should be appreciated that the communications network 105 in some embodiments is embodied in any of a myriad of network configurations. In some embodiments, the communications network 105 embodies a public network (e.g., the Internet). In some embodiments, the communications network 105 embodies a private network (e.g., an internal localized, or closed-off network between particular devices). In some other embodiments, the communications network 105 embodies a hybrid network (e.g., a network enabling internal communications between particular connected devices and external communications with other devices). The communications network 105 in some embodiments includes one or more base station(s), relay(s), router(s), switch(es), cell tower(s), communications cable(s) and/or associated routing station(s), and/or the like. In some embodiments, the communications network 105 includes one or more user-controlled computing device(s) (e.g., a user owned router and/or modem) and/or one or more external utility devices (e.g., Internet service provider communication tower(s) and/or other device(s)).

Each of the components of the system architecture 100 may be communicatively coupled to transmit data to and/or receive data from one another over the same or different wireless and/or wired networks embodying the communications network 105. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1A illustrate certain system entities as separate, standalone entities communicating over the communications network 105, the various embodiments are not limited to this architecture. In other embodiments, one or more computing entities share one or more components, hardware, and/or the like, or otherwise are embodied by a single computing device such that connection(s) between the computing entities are over the communications network 105 are altered and/or rendered unnecessary. For example, in some embodiments, the aircraft system 104 includes some or all of the fault prediction system 103, such that an external communications network 105 is not required. In some embodiments, the aircraft system 104 embodies or includes the fault prediction system 103, for example as a software component of a single enterprise terminal.

The aircraft system 104 includes any number of computing device(s), system(s), physical component(s), and/or the like, that facilitates operation of an aircraft associated with the aircraft system 104. In some embodiments, the aircraft system 104 includes one or more physical component(s), connection(s) between physical component(s), and/or computing system(s) that control operation of one or more physical component therein. In some embodiments, aircraft system 104 includes one or more computing device(s) and/or system(s) embodied in hardware, software, firmware, and/or a combination thereof, that configure and/or otherwise control operation of one or more physical component(s) in the aircraft and/or aircraft system 104.

In some embodiments, the aircraft system 104 includes or otherwise embodies an integrated power plant system (IPPS). system. The IPPS may comprise an engine, and one or more aircraft components mounted on the outside and/or around the engine. In some embodiments, at least a portion of the one or more aircraft components with the engine define or otherwise represent an anti-ice system.

FIG. 1B illustrates an example anti-ice valve system 130 in accordance with at least one example embodiment of the present disclosure. Specifically, FIG. 1B illustrates an example nacelle anti-ice valve system 130 in accordance with at least one example embodiment of the present disclosure. As shown in FIG. 1B, the anti-ice valve system 130 includes an engine 140, a first thermal anti-ice bleed line pipe 142 coupled to the engine 140, a second thermal anti-ice bleed line pipe 144, an anti-ice valve 132 disposed between the first thermal anti-ice bleed line pipe 142 and the second thermal anti-ice bleed line pipe 144 or otherwise mounted on the first thermal anti-ice bleed line pipes (e.g., the first thermal anti-ice bleed line pipe 142 and the second thermal anti-ice bleed line pipe 144). The anti-ice valve 132, may be configured to facilitate selective supply of hot engine bleed air (e.g., hot air flow from the engine 140) through the first thermal anti-ice bleed line pipe 142 to the second thermal anti-ice bleed line pipe 144.

As shown in the illustrated example of FIG. 1B, the anti-ice valve system 130 includes a piccolo tube 146 coupled to the second thermal anti-ice bleed line pipe 144. The piccolo tube 146 may be configured to receive hot engine bleed air that flows through the second thermal anti-ice bleed line pipe 144 and deliver the hot engine bleed air to the exterior surfaces of the aircraft to prevent ice formation on the exterior surfaces.

The anti-ice valve 132 may be moveable between a closed position and an open position based on anti-ice command to selectively supply hot engine bleed air. The anti-ice valve 132 may be configured to move from a closed position to an open position in response to an open anti-ice command. For example, the open anti-ice command may represent a signal transmitted to the anti-ice valve to direct the anti-ice valve 132 to move to an open position, such that hot engine bleed air may flow through to the second thermal anti-ice bleed line pipe 144 and to the piccolo tube 146 (e.g. to allow the flow of hot engine bleed air to be delivered to the exterior surface of the aircraft via the piccolo tube 146). Additionally, the anti-ice valve 132 may be configured to move from an open position to a closed position in response to a close anti-ice command. The close anti-ice valve command may represent a signal transmitted to the anti-ice valve 132 to direct the anti-ice valve 132 to move to a closed position, such that hot engine bleed air does not flow through to the second thermal anti-ice bleed line pipe 144 and to the piccolo tube 146 (e.g. to restrict the flow of hot engine bleed air to the exterior surface of the aircraft).

As shown in the illustrated example of FIG. 1B, the anti-ice valve system includes a pressure sensor 134 coupled to the second thermal anti-ice bleed line pipe 144. The pressure sensor 134 may be configured to sense pressure in the second thermal anti-ice bleed line pipe 144. In some embodiments, the pressure sensor 134 comprise or is otherwise embodied as an ON/OFF switch. The pressure sensor 134 may be configured to transmit a signal in response to sensing pressure in the second thermal anti-ice bleed line pipe 144. In this regard, the pressure sensor 134 may be configured to indicate when hot engine bleed air is flowing through the second thermal anti-ice bleed line pipe 144 and thus to the piccolo tube 146. For example, an "ON" state of the pressure sensor 134 (e.g., embodied as an ON/OFF switch) may indicate that hot engine bleed air is flowing through the second thermal anti-ice bleed line 144. An "OFF" state of the pressure sensor 134 may indicate that hot engine bleed air is not flowing through the second thermal anti-ice bleed line 144. In some embodiments, and as shown in FIG. 1B, the anti-ice valve system 130 may also include an intake aft bulkhead 136 and an intake fwd bulkhead 138.

In some embodiments, the aircraft system 104 includes one or more recording devices 116. The one or more recording devices 116 may be configured to collect at least engine data associated with operation of the aircraft. In some embodiments, at least a portion (e.g., some or all) of the one or more recording devices 116 is onboard the aircraft. In some embodiments, the engine data collected by the one or more recording devices comprises measured and/or sampled data for one or more engine parameters (e.g., monitored engine parameters). Non-limiting examples of such engine parameters include engine speed, engine temperature, software parameter setting(s) within the ECU (e.g., engine controller) associated with the aircraft system 104, and/or the like.

It will be appreciated that different aircraft system 104, IPPS, and/or anti-ice valve system 130 may include different physical component(s), computing system(s), and/or the like.

The fault prediction system 103 includes one or more components configured to, individually or collectively, facilitate early detection of anti-ice failures. Specifically, the fault predictions system 103 includes one or more component configured to, individually or collectively, perform one or more functionalities associated with anti-ice failure prediction in accordance with at least one example embodiment of the present disclosure. In some embodiments, the fault prediction system includes a feature extraction subsystem 103A and/or a fault prediction subsystem 103B.

The feature extraction subsystem 103A may include one or more feature extraction subsystem server(s) 110 and/or one or more feature extraction models 112. In some embodiments, the feature extraction subsystem 103A is configured to extract one or more feature datasets based on engine data. The feature extraction subsystem 103A may be configured to receive engine data associated with a flight operation of an aircraft. The feature extraction subsystem 103A may be configured to receive the engine data associated with flight operation from the aircraft system 104. In some embodiments, the engine data is received from a recording device associated with the aircraft system 104. In some embodiments, the engine data is received from the recording device 116 in real-time during the flight operation associated with the aircraft. In some embodiments, the engine data is retrieved from a database storing the engine data at any time when a communications network is available. For example, in some embodiments, the engine data may be retrieved from a database storing the engine data when a Wi-Fi signal is available.

In some embodiments, the feature extraction subsystem 103A is configured to extract one or more feature datasets based on the engine data. For example, the feature extraction subsystem 103A may extract the one or more feature datasets using one or more feature extraction models 112. For example, the feature extraction subsystem 103A may extract the one or more feature datasets from the engine data by applying the feature dataset to the one or more feature extraction models 112. In some embodiments, the feature extraction model comprises a machine learning model.

In some embodiments, each feature dataset represents a data slice from the engine data that satisfies thermal anti-ice valve feature extraction criteria, as described further below. In some embodiments, each feature dataset (e.g., each extracted data slice) comprise anti-ice command data and anti-ice pressure data. The anti-ice pressure data may comprise output associated with the pressure sensor associated with the anti-ice system. The output, for example, may comprise a Boolean value. For example, the anti-ice pressure data may comprise a "1" or "0", where "1" indicates that the pressure sensor senses pressure indicative of hot engine bleed air flow. In some embodiments, a feature dataset may alternatively or additionally include anti-ice over pressure data and/or other data associated with the anti-ice valve system.

The fault prediction subsystem 103B may include one or more fault prediction subsystem server(s) 113 and/or one or more fault prediction models 114. In some embodiments, the fault prediction subsystem 103B is configured to receive the feature dataset(s) from the feature extraction subsystem 103A and generate, based on the feature dataset(s) an anti-ice valve fault prediction. For example, the fault prediction subsystem 103B may generate the anti-ice valve fault prediction based on the feature dataset. The anti-ice valve fault prediction may indicate early detection of a stuck-open thermal anti-ice valve (e.g., a failed open thermal anti-ice valve) associated with the thermal anti-ice valve. In some embodiments, the one or more engine valve fault predictions may be generated based at least in part on execution of a logic (such as logic 160 described below with respect to FIG. 1C.) and a fault prediction threshold.

In some embodiments, executing the logic comprises for each feature data set comparing the anti-ice command data to the anti-ice pressure data to determine whether the anti-ice command data and the anti-ice pressure data match, as described further below. In some embodiments, the abnormal anti-ice valve condition count for the engine data may be increased by a predetermined value (e.g., 1, 2, or the like) for each feature data set associated with an anti-ice command data and anti-ice pressure data mismatch. In some embodiments, generating an anti-ice valve fault prediction further includes evaluating the abnormal anti-ice valve condition count to determine whether it satisfies a fault prediction threshold, as described further below. In some embodiments, the anti-ice valve fault prediction is generated using one or more fault prediction models 114. In some embodiments, the fault prediction subsystem 103B is configured to initiate the performance of one or more prediction-based actions, as described further below.

FIG. 1C illustrates an example logic 160 that may be leveraged to facilitate early anti-ice failure detection. Specifically, the logic 160 may be leveraged to determine whether a feature data set is associated with an abnormal anti-ice valve condition, as further described below. As shown in FIG. 1C, the logic include at least an anti-ice command data 162 and anti-ice pressure data 164 as input. In some embodiments, the logic comprise determining whether the anti-ice valve command data and the anti-ice pressure data match to output an anti-ice valve fault prediction 166. In some embodiments, the anti-ice command data and the anti-ice pressure data are determined to match when the anti-ice command data is "0" (e.g., close anti-ice command signal transmitted to the anti-ice valve to switch to a closed position) and the anti-ice pressure data is also "0" (e.g., indicating that hot engine bleed air is not flowing through). Additionally, in some embodiments, the anti-ice command data and the anti-ice pressure data may be determined not to match when the anti-ice command data is "0" (e.g., close anti-ice command signal transmitted to the anti-ice valve to switch to a closed position) and the anti-ice pressure data is also "1" (e.g., indicating that hot engine bleed air is flowing through from the engine to a conduit (such as a piccolo tube) configured to deliver the hot engine bleed air to the exterior of the aircraft. A mismatch between the anti-ice command data and corresponding anti-ice pressure data as described above may indicate an abnormal anti-ice valve condition.

FIG. 2 illustrates a block diagram of an example apparatus that may be specially configured in accordance with at least one example embodiment of the present disclosure. Specifically, FIG. 2 depicts an example fault prediction apparatus 200 ("apparatus 200") specially configured in accordance with at least some example embodiments of the present disclosure. In some embodiments, the fault prediction system 103 and/or a portion thereof is embodied by one or more apparatuses, such as the apparatus 200 depicted and described in FIG. 2. The apparatus 200 includes processor 202, memory 204, input/output circuitry 206, communications circuitry 208, feature extraction circuitry 210, and/or fault prediction circuitry 212. In some embodiments, the apparatus 200 is configured, using one or more of the sets of circuitry embodied by processor 202, memory 204, input/output circuitry 206, communications circuitry 208, feature extraction circuitry 210, and/or fault prediction circuitry 212, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium (s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes a feature extraction circuitry 210. The feature extraction circuitry 210 includes hardware, software, firmware, and/or a combination thereof, that supports early predictions of anti-ice valve faults in anti-ice valve systems associated with aircraft systems. For example, the feature extraction circuitry 210 may include hardware components, software components, and/or a combination thereof configured to, with the processing circuitry 202, input/output circuitry 206 and/or communications circuitry 208, perform one or more functions associated with the feature extraction subsystem 103A (as described above with reference to FIG. 1A). For example, the feature extraction circuitry 210 may access, facilitate access, receive process, manipulate, provide, or otherwise use, or make available for use, data utilized by the fault prediction circuitry 212 to generate anti-ice fault predictions through, for example, the use of applications or APIs executed using a processor, such as the processor 202. In some embodiments, the feature extraction circuitry 210 may interact with the memory 204, which may store the aforementioned data. It should also be appreciated that, in some embodiments, the feature extraction circuitry 210 may include a separate processor, specially configured field programmable gate array (FPGA), or application specific interface circuit (ASIC) to receive such data utilized by the feature extraction circuitry 210 may also provide for communication with other components of the apparatus, system and/or external systems via a network interface provided by the communications circuitry.

In some embodiments, the apparatus 200 includes a fault prediction circuitry 212. The fault prediction circuitry 212 includes hardware, software, firmware, and/or a combination thereof, that supports early predictions of anti-ice valve faults in anti-ice valve systems associated with aircraft systems. For example, the fault prediction circuitry 212 may include hardware components, software components, and/or a combination thereof configured to, with the processing circuitry 202, input/output circuitry 206 and/or communications circuitry 208, perform one or more functions associated with the fault prediction subsystem 103B (as described above with reference to FIG. 1A). For example, the fault prediction circuitry 212 may access, facilitate access, receive process, manipulate, provide, or otherwise use, or make available for use, data utilized by the one or more components of the apparatus 200 through, for example, the use of applications or APIs executed using a processor, such as the processor 202. In some embodiments, the fault prediction circuitry 212 may interact with the memory 204, which may store the aforementioned data. It should also be appreciated that, in some embodiments, the fault prediction circuitry 212 may include a separate processor, specially configured field programmable gate array (FPGA), or application specific interface circuit (ASIC) to receive such data utilized by the fault prediction circuitry 212 may also provide for communication with other components of the apparatus, system and/or external systems via a network interface provided by the communications circuitry.

Alternatively or additionally or in some embodiments, one or more of the sets of circuitries embodying processor 202, memory 204, input/output circuitry 206, communications circuitry 208, feature extraction circuitry 210, and/or fault prediction circuitry 212. perform some or all of the functionality described as associated with another component. For example, in some embodiments, two or more of the sets of circuitry embodied by processor 202, memory 204, input/output circuitry 206, communications circuitry 208, feature extraction circuitry 210, and/or fault prediction circuitry 212 are combined into a single module embodied in hardware, software, firmware, and/or a combination thereof. Similarly, in some embodiments, one or more of the sets of circuitry, for example feature extraction circuitry 210 and/or fault prediction circuitry 212, is/are combined with the processor 202, such that the processor 202 performs one or more of the operations described above with respect to each of these sets of circuitry embodied by the feature extraction circuitry 210 and/or the fault prediction circuitry 212.

Example System Operations

FIG. 3 illustrates a data flow diagram 300 showing example data structures for early anti-ice valve fault detection in accordance with at least one example embodiment of the present disclosure.

In some embodiments, engine data 302 associated with a flight operation of an aircraft is received. In some embodiments, the engine data 302 is received, by the fault prediction system 103, from the aircraft system 104. For example, one or more servers (e.g., at least one of the one or more feature extraction subsystem servers 110) may be configured to receive the engine data 302. In some embodiments, the engine data 302 is received from a recording device, such as recording device 116, associated with the aircraft system 104. The recording device 116, for example, may be onboard the aircraft or otherwise associated with the aircraft. The recording device 116 may be configured to collect and store data associated with the engine (e.g., during a flight operation). In some embodiments, the recording device 116 is configured to transmit the engine data 302 over one or more communications networks. In an example embodiment, the communications network comprises Wi-Fi communications network. In an example embodiment, the engine data 302 transmitted from the aircraft system 104, and received by the fault prediction system 103, may comprise 10 Hz full aircraft flight data.

In some embodiments, the engine data 302 is recorded in real-time by the recording device 116. In some embodiments, the engine data 302 is stored in one or more databases associated with the aircraft system 104. For example, the engine data 302 may be stored in a storage space embodied by the recording device 116. Alternatively or additionally, the engine data 302 may be stored in one or more databases external to the recording device 116. In some embodiments, the engine data 302 is received from the recording device 116 in real-time during the flight operation associated with the aircraft. In some embodiments, the engine data 302 is retrieved from a database storing the engine data 302 at any time when a communications network is available. For example, in some embodiments, the engine data 302 may be retrieved from a database storing the engine data 302 when a Wi-Fi signal is available.

In some embodiments, the engine data 302 comprises measured data for one or more engine parameters. The engine data 302 may comprise timeseries data of the one or more engine parameters Non-limiting examples of engine parameters include engine speed, engine temperature, software parameter settings within the ECU associated with aircraft system 104, and/or the like. In some embodiments, the engine data 302 collected by the recording device 116 is configurable. For example, the list of engine parameters to be monitored, measured, (e.g., using one or more sensors, and/or other monitoring devices), and/or collected by the aircraft system 104 may be configurable.

In some embodiments, the aircraft system 104 includes an anti-ice system, such as anti-ice valve system 130 described above. In some embodiments, the engine data 302 includes data associated with the anti-ice valve system 130. In such some embodiments, the engine data 302 may include data associated with anti-ice valve (e.g., such as anti-ice valve 132) of the anti-ice valve system 130, data associated with the pressure sensor (e.g., such as pressure sensor 134) of the anti-ice system, and/or data associated with other components of the anti-ice valve system. For example, the engine data 302 may include anti-ice pressure data, anti-ice over pressure data, anti-ice command data for the duration of the flight operation (or portion of the flight operation).

In an example embodiment, the engine data 302 includes one or more parameter counts and/or settings generated by the ECU associated with the aircraft. In such example embodiments, at least a portion of the one or more parameter counts and/or settings may be associated with the anti-ice valve system. Non-limiting examples of the parameter counts and/or settings includes unconfirmed anti-ice valve failure counts.

In some embodiments, one or more feature datasets 306 is extracted from the engine data 302. In some embodiments, the one or more feature datasets 306 is extracted using one or more feature extraction models 112. For example, in some embodiments, the fault prediction system 103 may extract the one or more feature datasets 306 from the engine data 302 by applying the feature dataset 306 to one or more feature extraction models 112. In some embodiments, the feature extraction model comprises a machine learning model.

In some embodiments, each feature dataset 306 represents a data slice from the engine data (e.g., data slice from the timeseries engine data) that satisfies thermal anti-ice valve feature extraction criteria. In some embodiments, the thermal anti-ice valve feature extraction criteria comprises anti-ice command event where the anti-ice command changed from an open anti-ice command to a close anti-ice command. In this regard, in some embodiments, extracting the one or more feature datasets 306 may comprise identifying from the engine data 302 (e.g., timeseries engine data 302)

occurrence of anti-ice command events where the anti-ice command changed from an open anti-ice command to a close anti-ice command, and extracting data slices associated with the anti-ice command events.

By way of example, extracting a data slice associated with such anti-ice command event occurring at time "t" may comprise extracting, from the engine data 302, data associated with t−N minutes and data associated with t+M minutes. In this regard, the data slice (e.g., representing a feature dataset) may comprise t−N data and t+M data from the engine data 302. In some embodiments, N (e.g., 0, 2, 5, or the like) and M (e.g., 0, 2, 5, or the like) are the same. In other embodiments N is not equal to M. In some embodiments, an open anti-ice command may correspond to a logic state of 1 and a close anti-ice command may correspond to a logic state of 0. In some embodiments, an open anti-ice command may correspond to a logic state of 0 and a close anti-ice command may correspond to a logic state of 1.

Alternatively or additionally, in some embodiments, the thermal anti-ice valve feature extraction criteria comprises occurrence of an unconfirmed anti-ice failure signal setting of "1" (e.g., the unconfirmed anti-ice failure signal is "True") The unconfirmed anti-ice failure signal may represent an output of a portion of an anti-ice failure detection logic associated with the ECU. The unconfirmed anti-ice failure signal of "1" may be indicative of an abnormal condition associated with the anti-ice valve. In some embodiments, extracting the one or more feature datasets 306 may comprise identifying from the engine data 302 occurrence of an unconfirmed anti-ice failure signal setting of "1", and extracting data slices associated with the occurrence of the unconfirmed anti-ice failure signal setting of "1".

By way of example, extracting a data slice associated with an unconfirmed anti-ice failure signal setting of "1" occurring at time "t" may comprise extracting, from the engine data 302, data associated with t−N minutes and data associated with t+M minutes. In this regard, the data slice (e.g., representing a feature dataset) may comprise t−N data and t+M data from the engine data 302. In some embodiments, N (e.g., 0, 2, 5, or the like) and M (e.g., 0, 2, 5, or the like) are the same. In other embodiments N is not equal to M.

In some embodiments, each feature dataset (e.g., each extracted data slice) comprise anti-ice command data and anti-ice pressure data. The anti-ice pressure data may comprise output associated with the pressure sensor associated with the anti-ice system. The output, for example, may comprise a Boolean value. For example, the anti-ice pressure data may comprise a "1" or "0", where "1" indicates that the pressure sensor senses pressure in the conduit coupled to the pressure sensor (e.g., the second thermal anti-ice bleed line pipe 144 described above with respect to FIG. 1B). In some embodiments, a feature dataset may alternatively or additionally include anti-ice over pressure data and/or other data associated with the anti-ice valve system.

In some embodiments, one or more preprocessing operations may be performed before extracting the one or more feature datasets 306. For example, where the engine data 302 includes data associated with multiple flight operations (e.g., more than one flight cycle), a splitting and validation operation may be performed. The splitting and validation operation may comprise segmenting the engine data 302 into a plurality of engine data segments, where each engine data segment comprise engine data for a respective flight operation. In some embodiments, the one or more preprocessing operations comprise schema validation configured to validate the various aspects of the engine data such as, for example, the data format, data scheme, and/or the like.

In some embodiments, an anti-ice valve fault prediction 308 is generated based on the feature dataset 306. The anti-ice valve fault prediction may represent a health indicator of the anti-ice valve associated with the anti-ice system embodied by the aircraft system. The anti-ice valve fault prediction, for example, may correspond to early detection of a stuck-open thermal anti-ice valve (e.g., a failed open thermal anti-ice valve) associated with the thermal anti-ice valve. A stuck-open thermal anti-ice valve, for example, may describe a condition where the pressure sensor associated with the anti-ice system indicates hot engine bleed air flow when the anti-ice command is set to OFF (e.g., closed open anti-ice command).

In some embodiments, the one or more engine valve fault predictions 308 may be generated based at least in part on execution of a logic (such as logic 160 described above with respect to FIG. 1C.) and a fault prediction threshold. In some embodiments, executing the logic comprises for each feature data set comparing the anti-ice command data to the anti-ice pressure data to determine whether the anti-ice command data and the anti-ice pressure data match. In some embodiments, the anti-ice command data and the anti-ice pressure data are determined to match when the anti-ice command data is "0" (e.g., close anti-ice command signal transmitted to the anti-ice valve to switch to a closed position) and the anti-ice pressure data is also "0" (e.g., indicating that hot engine bleed air is not flowing through). Additionally, in some embodiments, the anti-ice command data and the anti-ice pressure data may be determined not to match when the anti-ice command data is "0" (e.g., close anti-ice command signal transmitted to the anti-ice valve to switch to a closed position) and the anti-ice pressure data is also "1" (e.g., indicating that hot engine bleed air is flowing through from the engine to a conduit (such as a piccolo tube) configured to deliver the hot engine bleed air to the exterior of the aircraft. A mismatch between the anti-ice command data and corresponding anti-ice pressure data as described above may indicate an abnormal anti-ice valve condition. For example, the mismatch may indicate a condition where the pressure sensor is sensing pressure even though the anti-ice command indicates that the anti-ice valve should be shut.

In some embodiments, an abnormal anti-ice valve condition count for the engine data 302 is increased by a predetermined value (e.g., 1, 2, or the like) for each feature data set associated with an anti-ice command data and anti-ice pressure data mismatch. For example, each feature dataset may be evaluated to determine if the corresponding anti-ice command and the anti-ice valve data match, and in response to determining that the anti-ice command data and anti-ice pressure data do not match, the abnormal anti-ice valve condition count for the engine data 302 is increased by the predetermined value. An abnormal anti-ice valve condition count may correspond to an unconfirmed anti-ice failure signal setting of "1" in the ECU failure detection logic.

In some embodiments, the abnormal anti-ice valve condition count is evaluated to determine whether it satisfies a fault prediction threshold. The fault prediction threshold may describe a minimum abnormal anti-ice valve condition count. In this regard, a positive anti-ice valve fault prediction may be generated in response to determining that the abnormal anti-ice valve condition count associated with the flight operation satisfies the fault prediction threshold (e.g., equals to or greater than the fault prediction threshold). A negative anti-ice valve fault prediction may be generated in response to determining that the abnormal anti-ice valve condition count fails to satisfy the fault prediction threshold.

In some embodiments, the anti-ice valve fault prediction 308 is generated using one or more fault prediction models 114. The one or more fault prediction models 114, for example, may comprise or otherwise implement the logic 160. In this regard, in some embodiments, the fault prediction system 103 may generate an anti-ice valve fault prediction by applying the one or more feature datasets 306 to the one or more fault prediction models 114, where the one or more fault prediction models 114 may be configured to execute a logic, such as logic 160, to generate the one or more fault predictions.

In some embodiments, the performance of one or more prediction-based actions is initiated based on the one or more engine fault predictions 308. For example, the performance of one or more prediction-based actions may be initiated based on a positive anti-ice valve fault prediction. In some embodiments, the one or more prediction-based actions comprises generating one or more notifications and/or alerts. In some embodiments, the one or more notifications and/or alerts is provided to a user. For example, a user interface comprising the one or more notifications and/or alerts may be caused to be rendered on a user device.

The one or more notifications and/or alerts, for example, may include one or more recommendations such as, for example, one or more recommended corrective actions. By way of non-limiting example, the one or more notifications and/or alerts may include a recommendation to repair the thermal anti-ice valve associated with the anti-ice valve fault prediction, replace the thermal anti-ice valve associated with the positive anti-ice valve fault prediction, or to perform any other maintenance with respect to the thermal anti-ice valve associated with the positive anti-ice valve fault prediction. In this regard, the user (e.g., operator, supervisor, and/or the like) may be provided with an early maintenance recommendation to, for example, avoid aircraft on ground situation or any type of flight deck effect).

FIG. illustrates an example user interface 400. As shown in FIG. 4, the user interface includes a health indicator 410A that describes the fault condition (e.g., stuck open thermal anti-ice valve), a description 410B that provides additions detail regarding the fault condition, a recommendation 410C that describes suggested corrective action, and/or a severity level 410D associated with the thermal anti-ice valve fault.

Example Processes of the Disclosure

Having described example systems and apparatuses, data visualizations, and formulas in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 5 illustrates flowchart including operations of an example process early anti-ice valve fault detection in accordance with at least one example embodiment of the present disclosure. Specifically, FIG. 5 depicts an example process 500 for generating anti-ice valve fault predictions. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with separate component(s) of a network, external network(s), and/or the like, to perform one or more of the operation(s) as depicted and described. For purposes of simplifying the description, the process 500 is described as performed by and from the perspective of the apparatus 200.

Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

According to some examples, the method includes at operation 502, receiving engine data associated with a flight operation of an aircraft. For example, the apparatus 200 may receive engine data associated with flight operation from the aircraft system 104. In some embodiments, the engine data is received from a recording device associated with the aircraft system 104. In some embodiments, the recording device 116 is configured to transmit the engine data over one or more communications networks. In an example embodiment, the communications network comprises Wi-Fi communications network. In some embodiments, the engine data is received from the recording device 116 in real-time during the flight operation associated with the aircraft. In some embodiments, the engine data is retrieved from a database storing the engine data at any time when a communications network is available. For example, in some embodiments, the engine data may be retrieved from a database storing the engine data when a Wi-Fi signal is available.

In some embodiments, the engine data comprises measured data for one or more engine parameters. The engine data may comprise timeseries data of the one or more engine parameters. Non-limiting examples of engine parameters include engine speed, engine temperature, software parameter settings within the ECU associated with aircraft system 104, and/or the like. In some embodiments, the engine data collected by the recording device 116 is configurable.

In some embodiments, the engine data includes data associated with an anti-ice system embodied by the aircraft system such as, for example, anti-ice valve system 130. In such some embodiments, the engine data may include data associated with the anti-ice valve of the anti-ice valve system 130, data associated with the pressure sensor of the anti-ice system, and/or data associated with other components of the anti-ice valve system. For example, the engine data may include anti-ice pressure data, anti-ice over pressure data, anti-ice command data for the duration of the flight operation (or portion of the flight operation).

In an example embodiment, the engine data includes one or more parameter counts and/or settings generated by the ECU associated with the aircraft system. In such example embodiments, at least a portion of the one or more parameter counts and/or settings may be associated with the anti-ice valve system. Non-limiting examples of the parameter counts and/or settings includes unconfirmed anti-ice valve failure counts.

According to some examples, the method includes at operation 504 extracting one or more feature datasets based on the engine data. For example, the apparatus 200 may extract the one or more feature datasets using one or more feature extraction models, such as feature extraction models 112. For example, in some embodiments, the apparatus 200 may extract the one or more feature datasets from the engine data by applying the feature dataset to one or more feature extraction models. In some embodiments, the feature extraction model comprises a machine learning model.

In some embodiments, each feature dataset represents a data slice from the engine data that satisfies thermal anti-ice valve feature extraction criteria. In some embodiments, the thermal anti-ice valve feature extraction criteria comprises anti-ice command event where the anti-ice command changed from an open anti-ice command to a close anti-ice command. In this regard, in some embodiments, extracting the one or more feature datasets may comprise identifying from the engine data occurrence of anti-ice command events where the anti-ice command changed from an open anti-ice command to a close anti-ice command, and extracting data slices associated with the anti-ice command events.

By way of example, extracting a data slice associated with such anti-ice command event occurring at time "t" may comprise extracting, from the engine data 302, data associated with t−N minutes and data associated with t+M minutes, where N may be equal to M or may not be equal to M. In some embodiments, an open anti-ice command may correspond to a logic state of 0 and a close anti-ice command may correspond to a logic state of 1.

Alternatively or additionally, in some embodiments, the thermal anti-ice valve feature extraction criteria comprises occurrence of an unconfirmed anti-ice failure signal setting of "1". As described above, the unconfirmed anti-ice failure signal may represent an output of a portion of an anti-ice failure detection logic associated with the ECU The unconfirmed anti-ice failure signal of "1" may be indicative of an abnormal condition associated with the anti-ice valve. In some embodiments, extracting the one or more feature datasets may comprise identifying from the engine data 302 occurrence of an unconfirmed anti-ice failure signal setting of "1", and extracting data slices associated with the occurrence of the unconfirmed anti-ice failure signal setting of "1". By way of example, extracting a data slice associated with an unconfirmed anti-ice failure signal setting of "1" occurring at time "t" may comprise extracting, from the engine data 302, data associated with t−N minutes and data associated with t+M minutes, where N may be equal to M or may not be equal to M.

In some embodiments, each feature dataset (e.g., each extracted data slice) comprise anti-ice command data and anti-ice pressure data. The anti-ice pressure data may comprise output associated with the pressure sensor associated with the anti-ice system. The output, for example, may comprise a Boolean value. For example, the anti-ice pressure data may comprise a "1" or "0", where "1" indicates that the pressure sensor senses pressure indicative of hot engine bleed air flow. In some embodiments, a feature dataset may alternatively or additionally include anti-ice over pressure data and/or other data associated with the anti-ice valve system.

According to some examples, the method includes at operation 506 generating based on the feature dataset an anti-ice valve fault prediction. For example, the apparatus 200 may generate the anti-ice valve fault prediction based on the feature dataset. The anti-ice valve fault prediction may indicate early detection of a stuck-open thermal anti-ice valve (e.g., a failed open thermal anti-ice valve) associated with the thermal anti-ice valve. In some embodiments, the one or more engine valve fault predictions may be generated based at least in part on execution of a logic (such as logic 160 described above with respect to FIG. 1C.) and a fault prediction threshold.

In some embodiments, executing the logic comprises for each feature data set comparing the anti-ice command data to the anti-ice pressure data to determine whether the anti-ice command data and the anti-ice pressure data match. In some embodiments, the anti-ice command data and the anti-ice pressure data are determined to match when the anti-ice command data is "0" (e.g., close anti-ice command signal transmitted to the anti-ice valve to switch to a closed position) and the anti-ice pressure data is also "0" (e.g., indicating that hot engine bleed air is not flowing through). Additionally, in some embodiments, the anti-ice command data and the anti-ice pressure data may be determined not to match when the anti-ice command data is "0" and the anti-ice pressure data is "1" (e.g., indicating that hot engine bleed air is flowing through to the exterior of the aircraft. A mismatch between the anti-ice command data and corresponding anti-ice pressure data as described above may indicate an abnormal anti-ice valve condition.

The abnormal anti-ice valve condition count for the engine data may be increased by a predetermined value (e.g., 1, 2, or the like) for each feature data set associated with an anti-ice command data and anti-ice pressure data mismatch.

In some embodiments, generating an anti-ice valve fault prediction further includes evaluating the abnormal anti-ice valve condition count to determine whether it satisfies a fault prediction threshold. As described above, the fault prediction threshold may describe a minimum abnormal anti-ice valve condition count. In this regard, a positive anti-ice valve fault prediction may be generated in response to determining that the abnormal anti-ice valve condition count associated with the flight operation satisfies the fault prediction threshold (e.g., equals to or greater than the fault prediction threshold). A negative anti-ice valve fault prediction may be generated in response to determining that the abnormal anti-ice valve condition count fails to satisfy the fault prediction threshold (e.g., equals to or less than the fault prediction threshold).

In some embodiments, the anti-ice valve fault prediction is generated using one or more fault prediction models, such as fault prediction models 114.

According to some examples, the method includes at operation 508 initiating the performance of one or more prediction-based actions is initiated based on the one or more engine fault predictions. For example, the apparatus 200 may initiate the performance of one or more prediction-based actions based on a positive anti-ice valve fault prediction. In some embodiments, the one or more prediction-based actions comprises generating one or more notifications and/or alerts. In some embodiments, the one or more notifications and/or alerts is provided to a user. For example, a user interface comprising the one or more notifications and/or alerts may be caused to be rendered on a user device.

The one or more notifications and/or alerts, for example, may include one or more recommendations such as, for example, one or more recommended corrective actions. By way of non-limiting example, the one or more notifications and/or alerts may include a recommendation to repair the thermal anti-ice valve associated with the positive anti-ice valve fault prediction, replace the thermal anti-ice valve associated with the anti-ice valve fault prediction, or to perform any other maintenance with respect to the thermal anti-ice valve associated with the positive anti-ice valve fault prediction. In this regard, the user (e.g., operator, supervisor, and/or the like) may be provided with an early maintenance recommendation to, for example, avoid aircraft on ground situation or any type of flight deck effect).

FIG. 6A illustrates an example validation test result in accordance with at least some example embodiments of the present disclosure. Specifically FIG. 6A illustrates an example engine data (e.g., timeseries data) showing anti-ice command data 162 and anti-ice pressure data 164. In the illustrated example of FIG. 6A, the anti-ice valve is associated with a normal closing operation. As shown in FIG. 6A, the anti-ice command data 162 and the anti-ice pressure data 164 match. In the illustrated example, a negative anti-ice failure prediction was generated indicating that the anti-ice valve is not associated with a stuck-open thermal anti-ice valve fault.

FIG. 6B illustrates an example validation test result in accordance with at least some example embodiments of the present disclosure. Specifically FIG. 6B illustrates an example engine data (e.g., timeseries data) showing anti-ice command data 162 and anti-ice pressure data 164. In the illustrated example of FIG. 6B, the anti-ice valve is associated with an abnormal condition. As shown in FIG. 6B, the anti-ice command data 162 and the anti-ice pressure data 164 do not match. In the illustrated example, a positive anti-ice failure prediction was generated indicating that the anti-ice valve is associated with a stuck-open thermal anti-ice valve fault.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for early anti-ice valve fault detection for an aircraft, the computer-implemented method comprising:

receiving, by one or more processors, engine data associated with a flight operation of the aircraft, wherein the engine data comprises timeseries data for one or more monitored engine parameters, and wherein the aircraft is associated with an anti-ice system comprising a thermal anti-ice valve and a pressure sensor;

extracting, by the one or more processors, one or more feature datasets based on the engine data and one or more feature extraction models, wherein each feature dataset represents a data slice from the engine data that satisfies thermal anti-ice valve feature extraction criteria, and wherein each feature dataset comprises anti-ice command data from an engine control unit (ECU) and an anti-ice pressure data;

generating, by the one or more processors, an anti-ice valve fault prediction by applying the feature dataset to one or more fault prediction models; and initiating, by the one or more processors, performance of one or more prediction-based actions based on the anti-ice valve fault prediction.

2. The computer-implemented method of claim 1, wherein the anti-ice valve fault prediction indicates a stuck-open thermal anti-ice valve condition associated with the thermal anti-ice valve.

3. The computer-implemented method of claim 1, wherein the one or more feature extraction models comprise a machine learning model.

4. The computer-implemented method of claim 1, wherein each feature dataset comprises the anti-ice command data and the anti-ice pressure data associated with the corresponding data slice, wherein the anti-ice command data is configured to facilitate selective supply of hot engine bleed air flow to one or more components of the anti-ice system and the anti-ice pressure data indicates an occurrence of the hot engine bleed air flow.

5. The computer-implemented method of claim 4, wherein generating the anti-ice valve fault prediction comprises:

for each feature dataset:

comparing the anti-ice command data to the anti-ice pressure data;

determining whether the anti-ice command data matches with the anti-ice pressure data; and in response to determining that the anti-ice command data and the anti-ice pressure data do not match, increasing an abnormal anti-ice valve condition count for the flight operation.

6. The computer-implemented method of claim 5, wherein generating the anti-ice valve fault prediction further comprises:

determining whether the abnormal anti-ice valve condition count satisfies a fault prediction threshold; and in response to determining that the abnormal anti-ice valve condition count satisfies the fault prediction threshold, generating a positive anti-ice valve fault prediction indicative of a stuck-open thermal anti-ice valve.

7. The computer-implemented method of claim 6, wherein the one or more prediction-based actions comprise:

generating one or more recommendations, in response to a positive anti-ice valve fault prediction; and causing rendering of a user interface comprising the one or more recommendations on a user device.

8. An apparatus for early anti-ice valve fault detection for an aircraft, the apparatus comprising at least one processor and at least one memory storing instructions that, when executed by the at least one processor, cause the apparatus to:

receive engine data associated with a flight operation of the aircraft, wherein the engine data comprises time-series data for one or more monitored engine parameters, and wherein the aircraft is associated with an anti-ice system comprising a thermal anti-ice valve and a pressure sensor;

extract, one or more feature datasets based on the engine data and one or more feature extraction models, wherein each feature dataset represents a data slice from the engine data that satisfies thermal anti-ice valve feature extraction criteria, and wherein each feature dataset comprises anti-ice command data from an engine control unit (ECU) and an anti-ice pressure data;

generate an anti-ice valve fault prediction by applying the feature dataset to one or more fault prediction models; and initiate performance of one or more prediction-based actions based on the anti-ice valve fault prediction.

9. The apparatus of claim 8, wherein the anti-ice valve fault prediction indicates a stuck-open thermal anti-ice valve condition associated with the thermal anti-ice valve.

10. The apparatus of claim 8, wherein the one or more feature extraction models comprise a machine learning model.

11. The apparatus of claim 8, wherein each feature dataset comprises anti-ice command data and the anti-ice pressure data associated with the corresponding data slice, wherein the anti-ice command data is configured to facilitate selective supply of hot engine bleed air flow and the anti-ice pressure data indicates an occurrence of the hot engine bleed air flow.

12. The apparatus of claim 11, wherein generating the anti-ice valve fault prediction comprises:

for each feature dataset:

comparing the anti-ice command data to the anti-ice pressure data;

determining whether the anti-ice command data matches with the anti-ice pressure data; and in response to determining that the anti-ice command data and the anti-ice pressure data do not match, increasing an abnormal anti-ice valve condition count for the flight operation.

13. The apparatus of claim 12, wherein generating the anti-ice valve fault prediction further comprises:

determining whether the abnormal anti-ice valve condition count satisfies a fault prediction threshold; and in response to determining that the abnormal anti-ice valve condition count satisfies the fault prediction threshold, generating a positive anti-ice valve fault prediction indicative of a stuck-open thermal anti-ice valve.

14. The apparatus of claim 13, wherein the one or more prediction-based actions comprise:

generating one or more recommendations, in response to a positive anti-ice valve fault prediction; and causing rendering of a user interface comprising the one or more recommendations on a user device.

15. At least one non-transitory computer-readable storage medium for early anti-ice valve fault detection for an aircraft, the at least one non-transitory computer-readable storage medium having computer coded instructions configured to, when executed by at least one processor:

receive engine data associated with a flight operation of the aircraft, wherein the engine data comprises time-series data for one or more monitored engine parameters, and wherein the aircraft is associated with an anti-ice system comprising a thermal anti-ice valve and a pressure sensor;

extract, one or more feature datasets based on the engine data and one or more feature extraction models, wherein each feature dataset represents a data slice from the engine data that satisfies thermal anti-ice valve feature extraction criteria, and wherein each feature dataset comprises anti-ice command data from an engine control unit (ECU) and an anti-ice pressure data;

generate an anti-ice valve fault prediction by applying the feature dataset to one or more fault prediction models; and initiate performance of one or more prediction-based actions based on the anti-ice valve fault prediction.

16. The at least one non-transitory computer-readable storage medium of claim 15, wherein the anti-ice valve fault prediction indicates a stuck-open thermal anti-ice valve condition associated with the thermal anti-ice valve.

17. The at least one non-transitory computer-readable storage medium of claim 15, wherein the one or more feature extraction models comprise a machine learning model.

18. The at least one non-transitory computer-readable storage medium of claim 15, wherein each feature dataset comprises the anti-ice command data and the anti-ice pressure data associated with the corresponding data slice, wherein the anti-ice command data is configured to facilitate selective supply of hot engine bleed air flow and the anti-ice pressure data indicates an occurrence of the hot engine bleed air flow.

19. The at least one non-transitory computer-readable storage medium of claim 18, wherein generating the anti-ice valve fault prediction comprises:

for each feature dataset:

comparing the anti-ice command data to the anti-ice pressure data;

determining whether the anti-ice command data matches with the anti-ice pressure data; and in response to determining that the anti-ice command data and the anti-ice pressure data do not match, increasing an abnormal anti-ice valve condition count for the flight operation.

20. The at least one non-transitory computer-readable storage medium of claim 19, wherein generating the anti-ice valve fault prediction further comprises:

determining whether the abnormal anti-ice valve condition count satisfies a fault prediction threshold; and in response to determining that the abnormal anti-ice valve condition count satisfies the fault prediction threshold, generating a positive anti-ice valve fault prediction indicative of a stuck-open thermal anti-ice valve.

* * * * *